(No Model.)
J. HOLLISTER.
NECK YOKE.
No. 269,858. Patented Jan. 2, 1883.
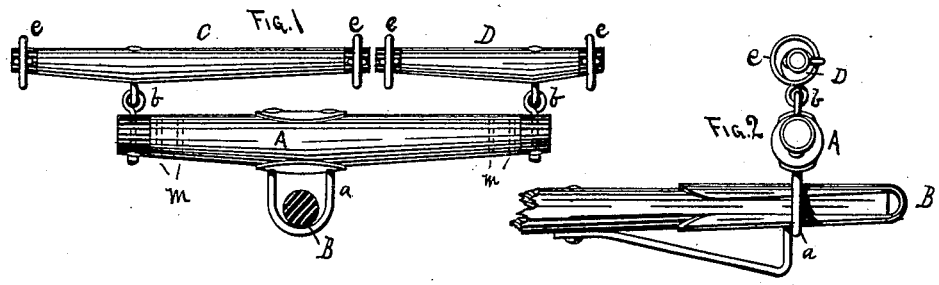
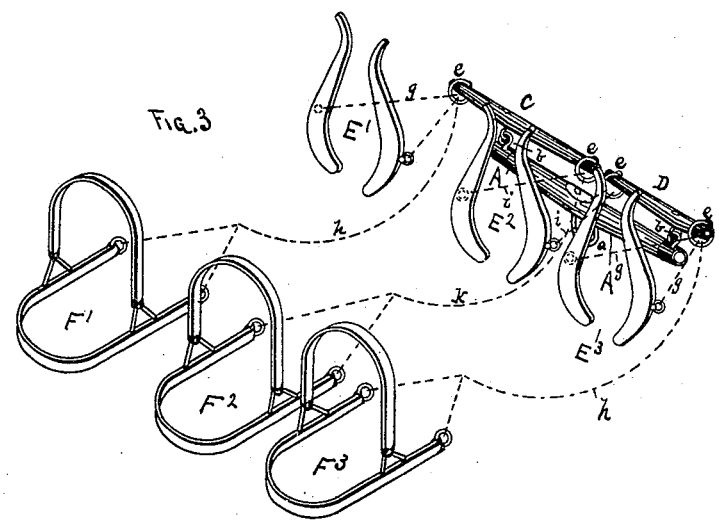
WITNESSES
Louis Feeser Jr.
Edw. Robert
James Hollister
INVENTOR, BY
Louis Feeser & Leo,
Atty's.

UNITED STATES PATENT OFFICE.

JAMES HOLLISTER, OF ST. PAUL, MINNESOTA.

NECK-YOKE.

SPECIFICATION forming part of Letters Patent No. 269,858, dated January 2, 1883.

Application filed September 25, 1882. (No model.)

*To all whom it may concern:*

Be it known that I, JAMES HOLLISTER, a resident of St. Paul, in the county of Ramsey and State of Minnesota, have invented certain new and useful Improvements in Three-Horse Neck-Yoke Eveners, of which the following is a specification.

This invention relates to "three-horse neck-yoke eveners;" and it consists in the construction and arrangement of parts hereinafter shown and described, and sought to be specifically claimed.

Figure 1 is a rear view, and Fig. 2 is an end view, of the yoke or evener and a portion of the forward end of the wagon-tongue, showing their relative positions. Fig. 3 is a perspective view of the evener, and diagrams of portions of the harness of the three horses, illustrating the manner of connecting them.

This device is intended to be used only when three horses are driven abreast to equalize the strain when backing or turning short angles, and consists in a main part or single-tree, A, having an eye or ring, $a$, by which the tongue B is held thereon, and two whiffletrees, C D, connected to the ends of the single-tree by flexible couplings $b$, as shown. The ring or eye $a$ is not in the center of the single-tree A, as will be seen, but is at a point about one-half the distance between one-third and one-half the length of the single-tree, or about five-twelfths the length of the single-tree from one end and seven-twelfths the length of the single-tree from the other end, thus leaving one end two-twelfths longer than the other end. Two of the horses will be placed upon the side of the tongue next the long end of the single-tree and one of the horses on the side next the short end.

The whiffletree C is about five-sixths the length of the single-tree, and the whiffletree D is about two-thirds the length of the whiffletree C. The whiffletrees C D are pivoted at $b$ to the ends of the single-tree A in the ordinary manner by flexible rings or eyes, and provided on their ends with rings or eyes $e$, by which the horses are attached. The pivot $b$ of the whiffletree C is placed about one-third its length from one end, with the short end outward and the long end inward toward and extending beyond the tongue B a short distance, while the pivot $b$ of the whiffletree D is placed about one-fourth the length of the whiffletree from the outer end, and with the long end inward toward and nearly to the inner end of the whiffletree C.

In Fig. 3 is shown the evener on a smaller scale in perspective, and also the hames $E'$ $E^2$ $E^3$, and breeching portions $F'$ $F^2$ $F^3$ of the harnesses of the three horses in their relative positions.

The hames and breeching of the outside horses are connected by straps, as indicated by dotted lines $g\,h$, in the ordinary manner, to the short outer ends of the whiffletrees C D, while the hames and breeching of the central horse are similarly attached, as indicated by dotted lines $i\,k$, to the inwardly-extending long ends of both the whiffletrees C D. By this arrangement the central horse, in backing, draws upon both the whiffletrees C and D by their long ends, and the outer horses each draw backward upon one of the same whiffletrees, and by the position of the pivoted points of whiffletrees C D, and also of the single-tree A upon the tongue B, the leverage is so equalized that all three of the horses are subjected to the same strain, and all bear an equal share of the work in backing or turning.

Ordinarily, where three horses are used, the work of backing or turning comes entirely upon the two horses immediately next the tongue, the third horse having no share in it; but by this arrangement the work is evenly divided among them all.

This device is especially adapted to harvesting machinery, but may be used wherever three horses are driven abreast. Where all the horses are of about the same weight and strength the pivotal points will be placed at about the points shown; but by providing a number of holes, $m$, for the pivots $b$ of the whiffletrees the leverage of the whiffletrees may be altered to adapt the device to a lighter or heavier horse to give such animal the benefit of the additional or decreased leverage.

Having described my invention and set forth its merits, what I claim is—

1. A three-horse equalizing neck-yoke consisting of the single-tree A, provided with means for pivoting it to a tongue, B, in combination with whiffletrees C and D, provided with means for attachment to harness, and pivoted to said single-tree, substantially as set forth, so as to give each horse an equal leverage in backing and turning, for the purposes specified.

2. A three-horse equalizing neck-yoke consisting of the single-tree A, provided with means for pivoting it to a tongue, B, in combination with whiffletrees C and D, having a longitudinally-adjustable connection with said single-tree, and provided with means for attachment to harness, and pivoted to said single-tree, substantially as set forth, so as to give each horse an equal leverage in backing and turning, for the purposes specified.

In testimony whereof I have hereunto set my hand in the presence of two subscribing witnesses.

JAMES HOLLISTER.

Witnesses:
C. N. WOODWARD,
LOUIS FEESER, Sr.